July 8, 1930.  L. E. GAUME  1,770,266
PURIFICATION OF SOLVENTS ADAPTED FOR USE IN DRY CLEANING
Filed Oct. 18, 1924

Inventor
Lewis E. Gaume
By Frease and Bond
Attorneys

Patented July 8, 1930

1,770,266

UNITED STATES PATENT OFFICE

LEWIS E. GAUME, OF AKRON, OHIO, ASSIGNOR TO THE MIRACLEAN COMPANY, OF CANTON, OHIO, A CORPORATION OF OHIO

PURIFICATION OF SOLVENTS ADAPTED FOR USE IN DRY CLEANING

Application filed October 18, 1924. Serial No. 744,357.

This invention relates to the scouring, chemical cleaning, reclaiming and deodorizing of dry cleaners' solvents, and is more particularly directed to the removal of foreign sustances from dry cleaners' solvents which have become rancid, thereby permitting the solvents to be used again.

The objects of the invention are to provide an improved method or process for removing all objectionable foreign matter from dry cleaners' solvents for purposes where it is necessary to produce odorless solvents; the process being such as to enable the scouring, chemical cleaning and deodorizing of dry cleaners' solvents before the same are used, or to keep said solvents clean during the use of the same, as well as to reclaim said solvents which have become rancid, owing to the large content of objectionable foreign matter, such as vegetable and animal oils, and the like.

The invention as illustrated and described, is carried out by the use of an apparatus shown in the accompanying drawing, in which—

Figure 1:
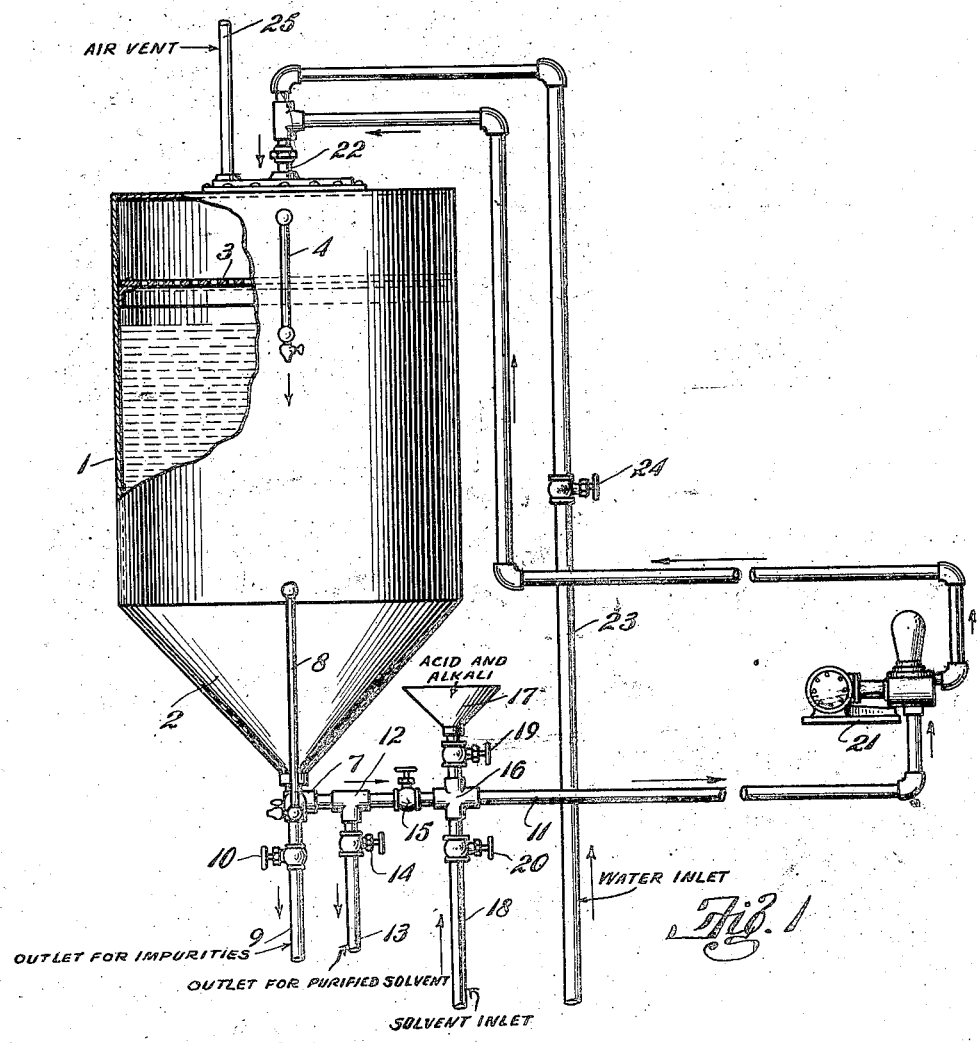

Figure 1 is a side elevation partly in section; and

Figure 2:
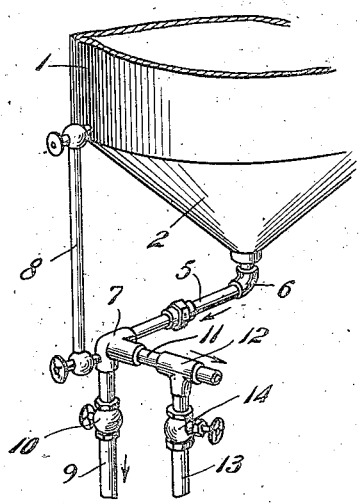

Fig. 2, a fragmentary perspective view of the apparatus.

Similar numerals refer to similar parts throughout the drawing.

The apparatus may comprise the tank 1 having the conical bottom 2 and provided with a perforated baffle plate 3, spaced from the upper end thereof, a gauge glass 4 being connected to the upper portion of the tank adjacent to said baffle plate to indicate the solvent level within the tank.

A short horizontal pipe 5 is shown connected to the conical bottom of the tank as by the elbow 6, said pipe extending radially to a point in line with the periphery of the tank, where it is connected with a three-way elbow 7, a gauge glass 8 being connected to said elbow and to the lower portion of the tank, as illustrated, to indicate the condition of the contents of the lower portion of the tank.

A waste pipe 9 leads downward from the elbow 7 and is provided at its upper end portion with a shut-off valve 10. A horizontal pipe 11 is connected to the elbow 7 and provided near said elbow with a T connection 12, to which is attached the draw-off pipe 13, provided with a cut-off valve 14 in its upper end portion.

A shut-off valve 15 is provided in the pipe 11 adjacent to the T connection 12 and a cross-shaped connection 16 is provided in the pipe beyond said valve, a hopper 17 being connected to the upper part of said cross connection and the supply pipe 18 to the lower part thereof, shut-off valves 19 and 20 being provided above and below the connection respectively.

The pipe 11 communicates with a pump 21 and then leads to the inlet 22 in the top of the tank. A water line 23 also communicates with the inlet 22 and is provided with a shut-off valve 24 normally closed. An air vent 25 is also provided in the upper end of the tank to carry off gases and fumes.

In operating the apparatus to carry out the improved method of cleaning, scouring, reclaiming or deodorizing dry cleaners' solvent, the solvent to be treated is drawn from the supply line by closing all of the valves, excepting the valve 20 and operating the pump, pumping the solvent into the tank until it reaches a point slightly below the baffle plate 3.

The solvent supply which may be gasoline is then shut off by closing the valve 20 and the valve 19 is opened and a cleaning compound is placed in the hopper 17 and pumped into the upper end of the tank. This cleaning compound may be either an alkali or an acid, depending upon the foreign matter contained in the solvent. Preferably an alkali and an acid both are used, as in the majority of cases it is found that it is necessary to use both to properly eliminate the impurities from the solvent.

Where both an alkali and an acid are used, either the alkali or the acid may be used first, although as hereinafter stated, it may be preferable to first use the alkali and then later use the acid. A solution of sulphuric acid may be used with good results and the alkali may consist of caustic soda or the like.

In the present case we will assume that an acid is placed in the hopper and pumped into the tank as above described.

The valve 19 is then closed and the valve 15 opened, and the pump operated, circulating the mixture of solvent and acid which may be gasolene and sulphuric acid from the tank through the pipe 11 and back through the tank, this circulation being continued for a sufficient length of time, depending upon the condition of the solvent being treated.

The acid being heavier than the gasolene, it will be seen that there will be little if any actual movement of the gasolene, the acid being continually circulated through the gasolene from top to bottom, taking out the animal and vegetable oils therefrom.

The valve 15 is then closed and the acid permitted to settle to the bottom of the tank, the level of the acid being indicated in the lower gauge glass 8. The valve 10 in the waste pipe is then opened, drawing off the acid from the bottom of the tank and when the gauge glass 8 indicates that the acid has been drawn from the tank, the valve 10 is again closed.

The valve 24 is then opened, admitting water into the upper portion of the tank, the water being distributed over the entire surface of the solvent by means of the perforated baffle plate 3, the waste valve 10 being open sufficiently to permit the water to be discharged from the tank as it passes downward through the solvent which, owing to its specific gravity, remains above the water and is indicated in gauge glass 8, and after valve 24 is closed, the valve 10 remains open until the residue of water in the tank, as indicated in the gauge glass 8, is entirely drawn off. The water thus washes the solvent of the acid and such particles of the oils as may be carried thereby.

For the purpose of neutralizing the acid, an alkali, such as caustic soda, is then placed in the hopper 17, the valve 19 is opened, admitting the alkali to the pipe 11 and the pump 21 is operated to pump the alkali into the upper end of the tank.

The valve 19 is then closed and the valve 15 opened and the solvent and alkali are circulated from the tank through the pipe 11 in the same manner as above described regarding the solvent and acid.

This circulation is continued for a period of time to be predetermined by the condition of the solvent, after which the valve 15 is closed and the pump stopped. The alkali is then permitted to settle to the bottom of the tank and drawn off through the waste pipe by operating the valve 10.

When all of the alkali has been withdrawn from the bottom of the tank, as indicated by gauge 8, water is again passed through the solvent as above described and withdrawn.

The valve 14 in the draw-off pipe is opened, drawing the treated solvent from the tank and conveying it to any suitable storage receptacle or the like.

From the above it will be seen that the improved method consists in the cleaning, scouring, reclaiming and deodorizing of dry cleaners' solvents by injecting cleaning compounds, which may be alkali or acid or both (as determined by the analysis of the solvent to be cleaned), into the solvent to be cleaned, circulating the solvent and cleaning compound until they are thoroughly mixed, then letting the solvent stand until the heavier cleaning compound has descended to the bottom of the tank, drawing off the compound with the impurities it has gathered from the solvent, then passing water through the solvent, permitting the water to settle to the bottom of the solvent and drawing off the water.

I claim:—

1. The process of purification of used solvents adapted for use in dry cleaning, which consists in distributing an acid over the entire surface of the solvent to be purified, continuously circulating the acid downward through the solvent, withdrawing the acid, distributing an alkali over the entire surface of the solvent, continuously circulating the alkali downward through the solvent, and withdrawing the alkali from the solvent.

2. The process of purification of used solvents adapted for use in dry cleaning, which consists in distributing an acid over the entire surface of the solvent to be purified, continuously circulating the acid downward through the solvent, withdrawing the acid, distributing an alkali over the entire surface of the solvent, continuously circulating the alkali downward through the solvent, withdrawing the alkali from the solvent, distributing water over the entire surface of the solvent, and continuously circulating the water downward through the solvent.

3. The process of purification of used solvents adapted for use in dry cleaning, which consists in distributing an acid over the entire surface of the solvent to be purified, continuously circulating the acid downward through the solvent, withdrawing the acid, distributing water over the entire surface of the solvent and continuously circulating the water downward through the solvent, withdrawing the water, distributing an alkali over the entire surface of the solvent, continuously circulating the alkali downward through the solvent, withdrawing the alkali, again distributing water over the entire surface of the solvent and continuously circulating the water downward through the solvent, and withdrawing the water.

4. The process of purification of used solvents adapted for use in dry cleaning, which consists in distributing sulphuric acid over the entire surface of the solvent to be purified, continuously circulating the acid downward through the solvent, withdrawing the acid, distributing water over the entire surface of the solvent and continuously circulating the water downward through the solvent, withdrawing the water, distributing caustic soda over the entire surface of the solvent, continuously circulating the alkali downward through the solvent, withdrawing the alkali, again distributing water over the entire surface of the solvent and continuously circulating the water downward through the solvent, and withdrawing the water.

In testimony that I claim the above, I have hereunto subscribed my name.

LEWIS E. GAUME.